United States Patent
Johnson

(10) Patent No.: US 11,574,058 B1
(45) Date of Patent: Feb. 7, 2023

(54) MALICIOUS CODE SCANNING OF REMOTELY-LOCATED FILES

(71) Applicant: Trend Micro Incorporated, Tokyo (JP)

(72) Inventor: Brendan Matthew Johnson, Dallas, TX (US)

(73) Assignee: Trend Micro Incorporated, Tokyo (JP)

( * ) Notice: Subject to any disclaimer, the term of this patent is extended or adjusted under 35 U.S.C. 154(b) by 127 days.

(21) Appl. No.: 17/110,703

(22) Filed: Dec. 3, 2020

(51) Int. Cl.
*G06F 21/56* (2013.01)

(52) U.S. Cl.
CPC .......... *G06F 21/565* (2013.01); *G06F 21/563* (2013.01); *G06F 2221/033* (2013.01)

(58) Field of Classification Search
CPC . G06F 21/565; G06F 21/563; G06F 2221/033
See application file for complete search history.

(56) References Cited

U.S. PATENT DOCUMENTS

| | | |
|---|---|---|
| 10,721,311 B1 | 7/2020 | McDonald |
| 10,740,149 B2 | 8/2020 | Bogineni et al. |
| 10,853,183 B2 | 12/2020 | Natanzon et al. |
| 10,884,807 B2 | 1/2021 | Shimamura et al. |
| 10,915,382 B2 | 2/2021 | Zhang et al. |
| 10,938,677 B2 | 3/2021 | Shimamura et al. |
| 2021/0117549 A1* | 4/2021 | Mandagere ........... G06F 21/577 |
| 2022/0164120 A1* | 5/2022 | Kannan ................. G06F 3/0631 |

* cited by examiner

*Primary Examiner* — Ashokkumar B Patel
*Assistant Examiner* — William B Jones
(74) *Attorney, Agent, or Firm* — Beyer Law Group LLP

(57) ABSTRACT

A file is stored in a public cloud storage. A serverless computing platform receives an event notification that the file has been stored and, in response, creates an instance of an ephemeral environment wherein a security module is executed. The security module creates a memory-mapped space with memory locations that are mapped to the entire content of the file but does not allocate memory for all of the memory locations. Instead, the security module retrieves sections of the file from the public cloud storage as these sections are accessed in their designated memory locations in accordance with the memory mapping, allocates memory for the retrieved sections, stores the retrieved sections in their designated memory locations, and scans the retrieved sections in their designated memory locations for malicious code. The security module continues scanning the file in sections until relevant sections of the file have been scanned.

6 Claims, 5 Drawing Sheets

MALICIOUS CODE SCANNING OF REMOTELY-LOCATED FILES

BACKGROUND OF THE INVENTION

1. Field of the Invention

The present invention relates generally to cybersecurity, and more particularly but not exclusively to scanning of files for malicious code.

2. Description of the Background Art

Public cloud refers to cloud computing services offered by third-party providers over the public Internet. The providers are "third-party" in that they are not associated with the users. Examples of public cloud computing services include cloud storage, serverless computing, webmail, etc. Users of public cloud computing services are able to run applications, store data, etc. without having to purchase and maintain their own computing infrastructure. While some public cloud computing services may be free, users generally pay the third-party providers based on central processing unit (CPU), memory, data storage, and/or network bandwidth consumption.

Public cloud storage is particularly beneficial not just to business users, but home and individual users as well. For example, public cloud storage allows for storage of various files including documents, digital photographs, digital music library, etc. A potential problem with storing files in public cloud storage is that some third-party providers do not allow users to execute applications in the public cloud storage. This makes it relatively difficult and costly to scan the files for malicious code, especially when the files are relatively large.

SUMMARY

In one embodiment, a file is stored in a public cloud storage. A serverless computing platform receives an event notification that the file has been stored in the public cloud storage and, in response, creates an instance of an ephemeral environment wherein a security module is executed. The security module creates a memory-mapped space with memory locations that are mapped to the entire content of the file but does not allocate memory for all of the memory locations. Instead, the security module retrieves sections of the file from the public cloud storage as these sections are accessed in their designated memory locations in accordance with the memory mapping, allocates memory for the retrieved sections, stores the retrieved sections in their designated memory locations, and scans the retrieved sections in their designated memory locations for malicious code. The security module continues scanning the file in sections until relevant sections of the file that may have malicious code have been scanned. The ephemeral environment is thereafter destroyed.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
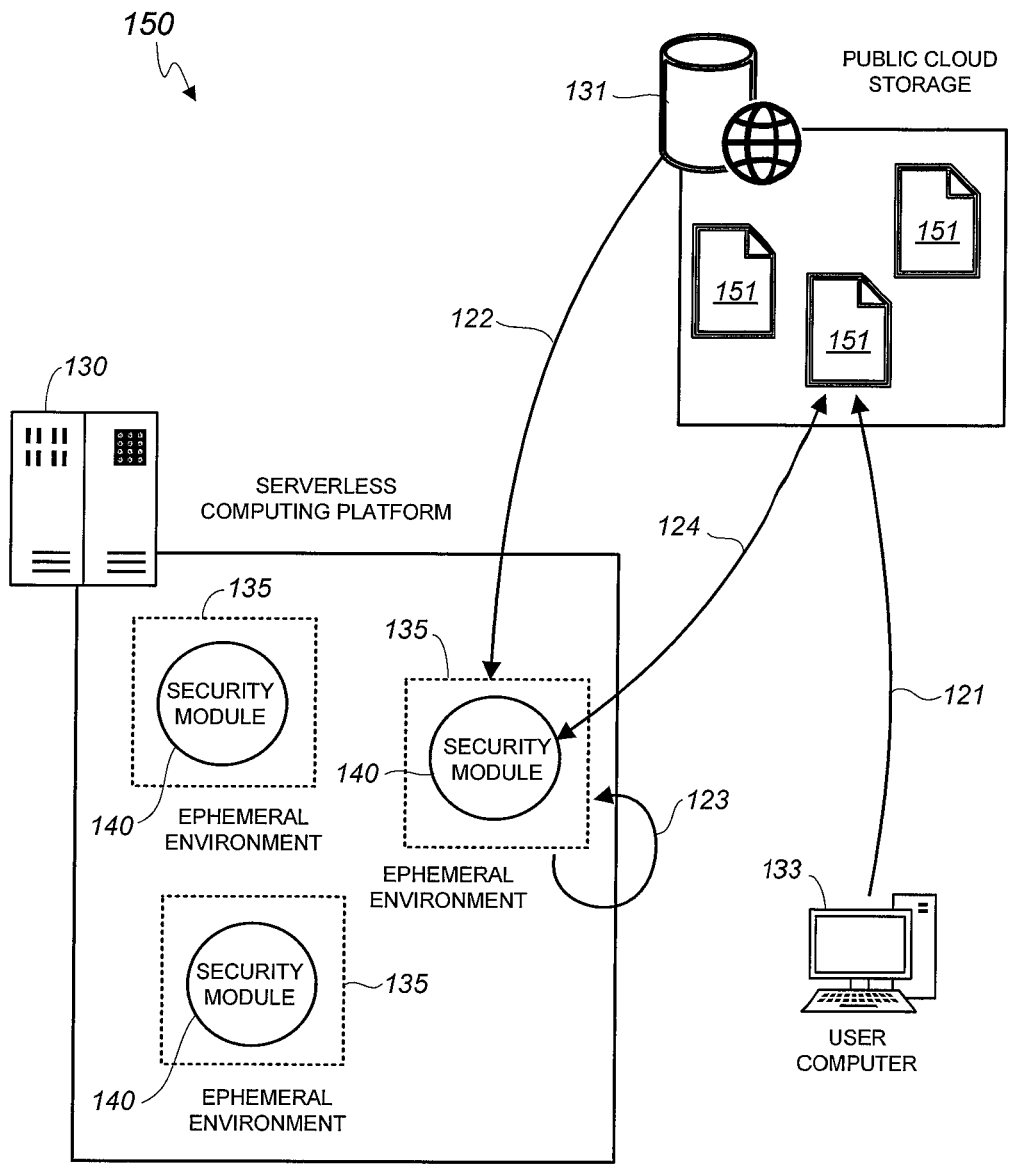
FIG. 1 shows a logical diagram of a system for scanning remotely-located files for malicious code in accordance with an embodiment of the present invention.

FIG. 1 shows a logical diagram of a system 150 for scanning remotely-located files for malicious code in accordance with an embodiment of the present invention. In the example of FIG. 1, a user may employ a user computer 133 to store one or more files 151 in a public cloud storage 131. The user computer 133 may comprise a desktop computer, server computer, mobile computer, or other computing device for storing and retrieving files over the public Internet, which in this example are files stored in a public cloud storage. The public cloud storage 131 may comprise one or more computers and storage devices. In one embodiment, the public cloud storage 131 is the Amazon S3™ public cloud storage provided by the Amazon Web Services (AWS)™. Other suitable public cloud storage services may also be used without detracting from the merits of the present invention.

Generally speaking, a public cloud storage can accommodate large file sizes, which may be up to 5 TB in some cases. A public cloud storage can also accommodate a large number of files. In the example of FIG. 1, applications cannot be executed in the public cloud storage 131. This makes it challenging to scan the files 151 for malicious code, as the files 151 will have to be transferred over the public Internet. For example, scanning the files 151 for malicious code in a virtual machine in-the-cloud or other network location external to the public cloud storage 131 may be cost-prohibitive because the files 151 may be large both in size and number.

In the example of FIG. 1, the system 150 includes a serverless computing platform 130. As is well known, serverless computing is a public cloud computing execution model in which the third-party provider provides and runs the server and dynamically manages the allocation of machine resources. Users are thus able to execute applications without having to purchase and operate their own servers (hence the name "serverless"). Third-party providers generally charge users based on CPU, memory, and network bandwidth consumption. The serverless computing platform 130 may comprise one or more computers. In one embodiment, the serverless computing platform 130 is the AWS Lambda™ serverless computing platform. Other suitable serverless computing platforms may also be employed without detracting from the merits of the present invention.

In the serverless computing platform 130, a security module 140 is executed in a runtime environment referred to herein as an ephemeral environment 135. As its name indicates, the environment 135 is "ephemeral" in that an instance of the environment 135 is created to execute the security module 140 once to scan a file 151 for malicious code; the security module 140 and the environment 135 are destroyed after the result of the scanning of the file 151 has been published out of the environment 135. In general, states and data retrieved or processed between instances of ephemeral environments 135 are not saved. In the case of the AWS Lambda™ serverless computing platform, the security module 140 may be deployed in a container, which provides or initiates an ephemeral environment 135.

In one embodiment, a single instance of an ephemeral environment 135 is created to execute a security module 140 that scans a single file 151 for malicious code. After the file 151 has been scanned for malicious code, the instance of the ephemeral environment 135 (and the security module 140) is destroyed. Another instance of the ephemeral environment 135 is created to execute a security module 140 to scan another file 151. The serverless computing platform 130 can create ephemeral environments 135 and associated security modules 140 on demand and is thus able to automatically scale up or down to scan different numbers of files 151 for malicious code.

A disadvantage with the serverless execution model is that the ephemeral environments are typically small. More particularly, in the example of FIG. 1, the size of a file 151 may be larger than what the ephemeral environment 135 can receive. For example, the size of a file 151 may be larger than the memory limit of the ephemeral environment 135. Therefore, the entire content of the file 151 cannot be copied from the cloud storage 131 to the ephemeral environment 135 for scanning. As will be more apparent below, embodiments of the present invention are able to operate with limited memory resources, allowing for scanning of arbitrarily large files stored in a public cloud storage even when the scanning is performed in an ephemeral environment of a serverless computing platform.

In an example operation, a file 151 may be transferred from a user computer 133 to the public cloud storage 131 for storage (see arrow 121). In one embodiment, an event notification is generated whenever a file 151 is stored in the public cloud storage 131. The event notification may be generated by the public cloud storage 131 or another computer that is configured to do so in response to completion of the storage of the file 151 in the cloud. In the example of FIG. 1, the event notification is received by the serverless computing platform 130 (see arrow 122). The event notification may include the network address of the file 151, the file size of the file 151, and other file information. In the case of the AWS S3™ public cloud storage, an event notification may include the bucket name, key, file size, eTag, etc. associated with the file. The bucket name and the key (which provides a file path within the bucket) allow for construction of a file path to the file.

In response to the event notification, the serverless computing platform 130 creates an instance of an ephemeral environment 135 (see arrow 123), which starts execution of a security module 140. The security module 140 accesses the file 151 (see arrow 124) by its network location over the public Internet, such as in accordance with the Hypertext Transfer Protocol Secure (HTTPS) protocol.

In the case of the AWS Lambda™ serverless computing platform, the security module 140 may be deployed as a serverless function with a specified entry point (e.g., function name) and a triggering event. The triggering event may be an "ObjectCreated" event from the AWS S3™ public cloud storage. In response to the triggering event, the serverless computing platform creates an ephemeral environment for the serverless function as specified, places the serverless function in the ephemeral environment, then calls the specified entry point to execute.

As will be later explained in more detail with reference to FIGS. 2-4, the security module 140 is configured to create a memory-mapped space with memory locations that are mapped to the entire content of the file 151 but does not allocate memory for all of the memory locations. Instead, the security module 140 retrieves sections of the file 151 from the public cloud storage 131 as these sections are accessed in their designated memory locations in accordance with the memory mapping, allocates memory for the retrieved sections, stores the retrieved sections in their designated memory locations, and scans the retrieved sections in their designated memory locations for malicious code. The security module 140 continues scanning the file 151 in sections until all relevant sections of the file 151 that may have malicious code have been scanned. This way, scanning of arbitrarily large files may be performed in an ephemeral environment with limited memory resources in a serverless computing platform.

Figure 2:
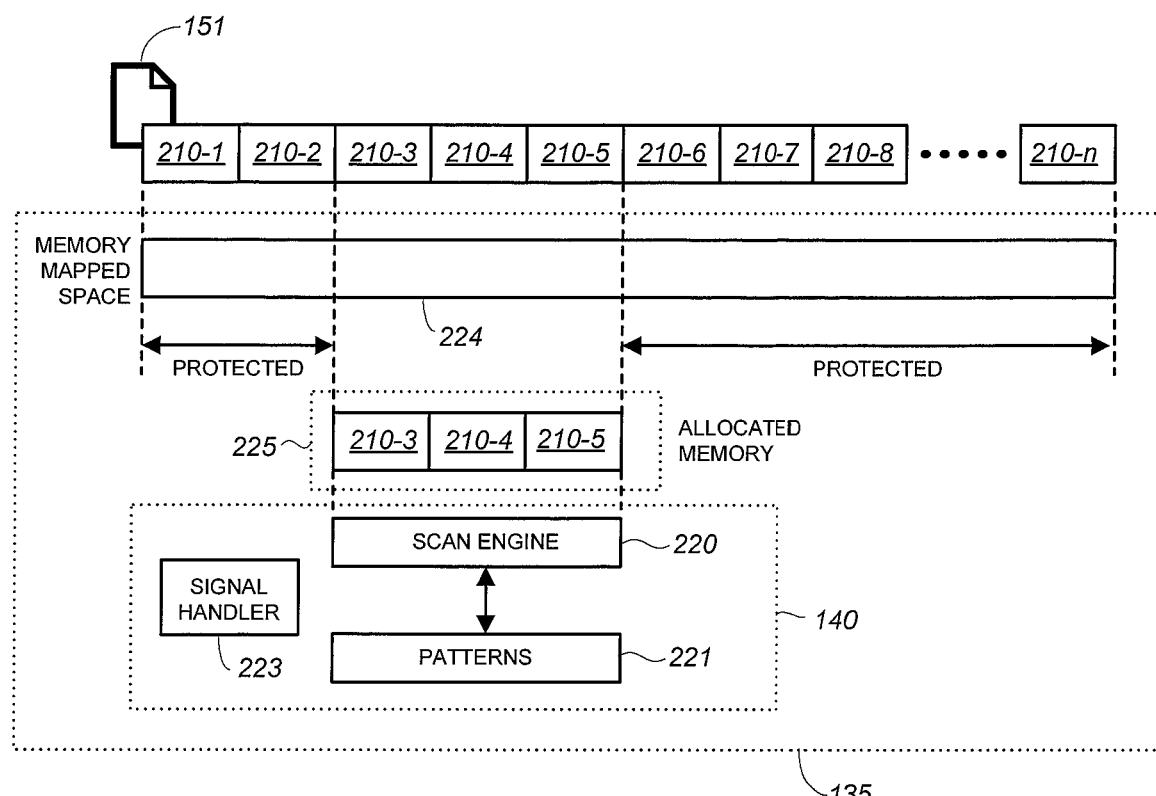
FIG. 2 pictorially illustrates a method of scanning a remotely-located file for malicious code in accordance with an embodiment of the present invention.

FIG. 2 pictorially illustrates a method of scanning a remotely-located file for malicious code in accordance with an embodiment of the present invention. In one embodiment, the security module 140 includes a scan engine 220, patterns 221, and a signal handler 223. As noted above, the security module 140 executes in an ephemeral environment 135.

In the example of FIG. 2, the security module 140 creates, in the ephemeral environment 135, a memory-mapped space (see FIG. 2, 224) with memory locations that are mapped to the entire content of the file 151. In one embodiment, the memory-mapped space has the same size as the file 151. The security module 140 maps the entire content of the file 151 to corresponding memory locations in the memory-mapped space (e.g., using "mmap( )" in the LINUX operating system) and marks these memory locations as protected (e.g., using "mprotect( )" with PROT_NONE in the LINUX operating system). In the example of FIG. 2, the signal handler 223 is registered to receive a signal when one or more of the protected memory locations are accessed.

In the example of FIG. 2, the security module 140 does not allocate memory for all memory locations in the memory-mapped space, because the size of the file 151 may be larger than the amount of memory that can be allocated in the ephemeral environment 135. In other words, although the entire content of the file 151 has designated memory locations in the memory-mapped space, these designated memory locations have no corresponding main memory.

The security module 140 provides the memory-mapped space to the scan engine 220 for scanning. Generally speaking, the scan engine 220 is configured to scan data, such as file contents, for malicious code. In one embodiment, the scan engine 220 is configured to scan the memory-mapped space for data that matches one or more malware patterns indicated in the patterns 221. Data that matches a pattern in the patterns 221 is detected to be malicious. In the example of FIG. 2, by scanning the content of memory locations in the memory-mapped space, the scan engine 220 is in effect scanning the file 151. The scan engine 220 may perform malicious code scanning using any suitable conventional algorithm without detracting from the merits of the present invention.

In the example of FIG. 2, the content of the file 151 is depicted as a plurality of sections 210 (i.e., 210-1, 210-2, etc.) that are mapped to memory locations in the memory-mapped space. In the example of FIG. 2, when the scan engine 220 attempts to access sections 210-3, 210-4, and 210-5 in their designated memory locations in accordance with the memory mapping, a signal is generated because the memory locations are protected. The signal is received by the signal handler 223, which has been registered to receive such signals. In response to the signal, the signal handler 223 pauses the scan engine 220; retrieves the sections 210-3, 210-4, and 210-5 of the file 151 from the public cloud storage 131; allocates memory for the sections 210-3, 210-4, and 210-5 (e.g., using "mprotect( )" with PROT_READ/WRITE in the LINUX operating system; see FIG. 2, 225); and stores the sections 210-3, 210-4, and 210-5 in designated memory locations in accordance with the memory mapping. The signal handler 223 removes the protection on the designated memory locations and resumes the scan engine 220. The scan engine 220 then scans the sections 210-3, 210-4, and 210-5 in their designated memory locations.

After the scanning, the signal handler 223 releases the memory allocated for the sections 210-3, 210-4, and 210-5 (e.g., using "munmap( )" in the LINUX operating system) to make room for the next sections 210 to be scanned for malicious code. The signal handler 223 may be configured to free and allocate memory to maintain the largest scanning memory size available in the ephemeral environment 135. As can be appreciated, because only certain sections, instead of the entire content, of the file 151, are received in the ephemeral environment at any given time, the file 151 can be of any arbitrary size. This allows the security module 140 to scan files that are larger than the memory limit of the ephemeral environment 135.

The just-described procedure of retrieving and scanning sections of the file 151 is repeated until all relevant sections of the file 151 have been scanned for malicious code. In general, most files do not require their entire content to be scanned for malicious code. For example, the patterns 221 may include information indicating, for different types of files, which sections of a file are likely to have malicious code. Sections of the file that are unlikely to have malicious code do not need to be scanned. Accordingly, although a memory-mapped space is created for the entire content of the file 151, it is likely that only some sections of the file 151 need to be retrieved into the ephemeral environment 135 for scanning. The network bandwidth consumption of the security module 140 is therefore cost-effective even when executed in a serverless computing platform, considering the savings in not having to purchase and operate servers to perform the scanning.

Figure 3:
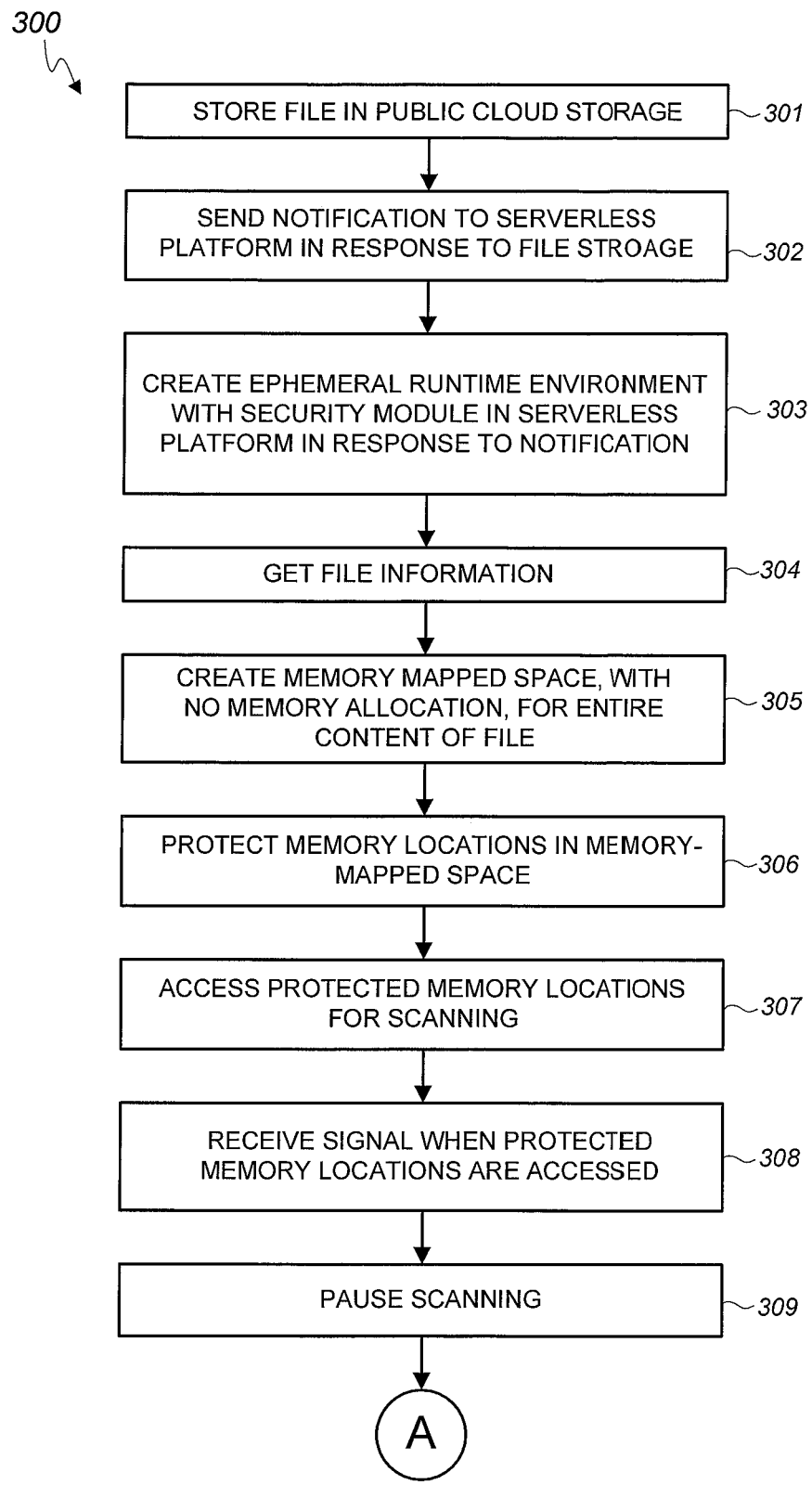
FIGS. 3 and 4 show a flow diagram of a method of scanning remotely-located files for malicious code in accordance with an embodiment of the present invention.
Figure 4:
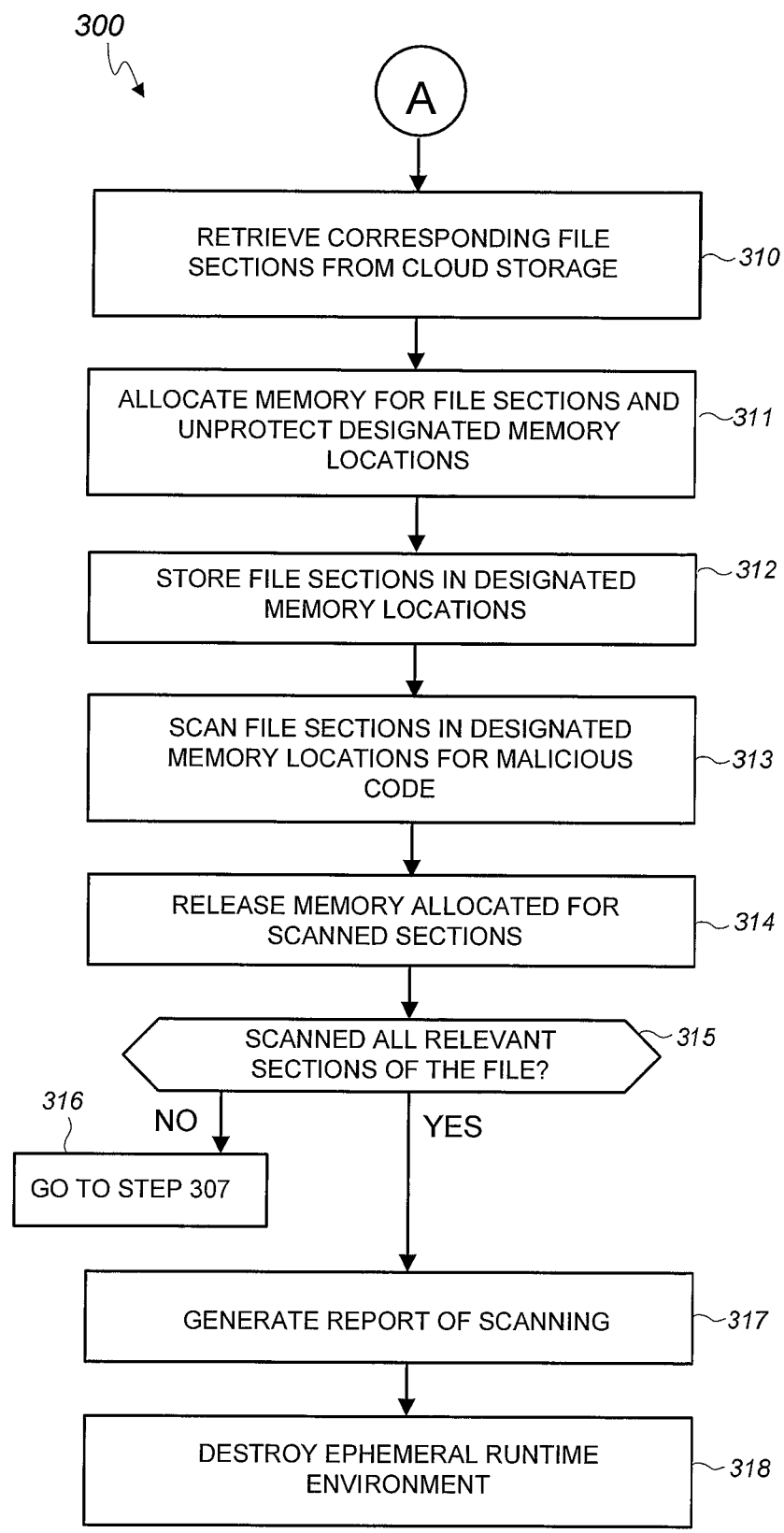

FIGS. 3 and 4 show a flow diagram of a method 300 for scanning remotely-located files for malicious code in accordance with an embodiment of the present invention. The method 300 may be performed by a security module that is executed in an ephemeral environment as explained above. As can be appreciated, other components may also be employed without detracting from the merits of the present invention.

In the method 300, a file is stored in a public cloud storage (step 301). The file may be transferred from a user computer to the public cloud storage over the public Internet. In response to the file being stored in the public cloud storage, the public cloud storage (or another computer system) sends an event notification to a serverless computing platform (step 302). In one embodiment, an event notification is sent for each stored file. In response to the event notification, the serverless computing platform creates an instance of an ephemeral environment wherein a security module executes (step 303). The security module accesses the file in its network location in the public cloud storage to obtain its file information, such as the size and structure of the file (step 304). In one embodiment, the RANGE HTTP header may be employed to determine the size of the file. More particularly, by requesting an arbitrary X bytes of the file from the public cloud storage, the public cloud storage will return a header indicating that X of Y bytes of the file are returned, i.e., the file size is Y bytes. The returned X bytes may be pre-populated to allocated memory locations in accordance with the memory mapping.

In the ephemeral environment, the security module creates a memory-mapped space with memory locations that are mapped to the entire content of the file but does not allocate memory for all of the memory locations (step 305). In one embodiment, the memory-mapped space comprises memory locations that are in the user space of the security module.

The security module protects the memory locations in the memory-mapped space (step 306). The security module provides the memory-mapped space to a scan engine, which accesses the memory locations to scan their content for malicious code (step 307). A signal is generated in the ephemeral environment when the scan engine accesses one or more protected memory locations in the memory-mapped space (step 308). A signal handler receives the signal and, in response to the signal, pauses the scan engine (step 309).

The accessed memory locations are designated to store particular sections of the file in accordance with the memory map. The signal handler retrieves these particular sections of the file from the public cloud storage (step 310). The signal handler allocates memory for the particular sections of the file and removes the protection of the memory locations that are designated for the particular sections of the file (step 311). The signal handler stores the particular sections of the file in their designated memory locations (step 312). After the particular sections of the file have been stored in their designated memory locations, the scan engine resumes scanning of the particular sections of the file in their designated memory locations (step 313). After the particular sections of the file have been scanned for malicious code, the signal handler releases the allocated memory locations to make room for the next sections of the file to be scanned (step 314). The above-described procedure of retrieving and scanning sections of the file is repeated until all relevant sections of the file that may contain malicious code have been scanned (step 315 to step 316).

The security module may a generate a report after the scanning of the file for malicious code (step 317). The report may indicate the result of scanning the file, including whether or not the file contains malicious code. The security module may send the report to another public cloud service, such as by way of the AWS Simple Notification Service (SNS)™ in the case of the AWS Lambda™ serverless computing platform. The other public cloud service may forward the report to an intermediary computer (e.g., an email address or network location designated to receive results of scanning) or directly to the user computer, for example. A corrective action may be performed in response to detecting that the file contains malicious code, such as putting the file in quarantine, deleting the file, blocking network traffic that includes the file, and/or other actions that would prevent users from accessing the file. The corrective action may be performed by the user computer or other computer. The ephemeral environment is destroyed after the file has been scanned for malicious code (step 318).

Figure 5:
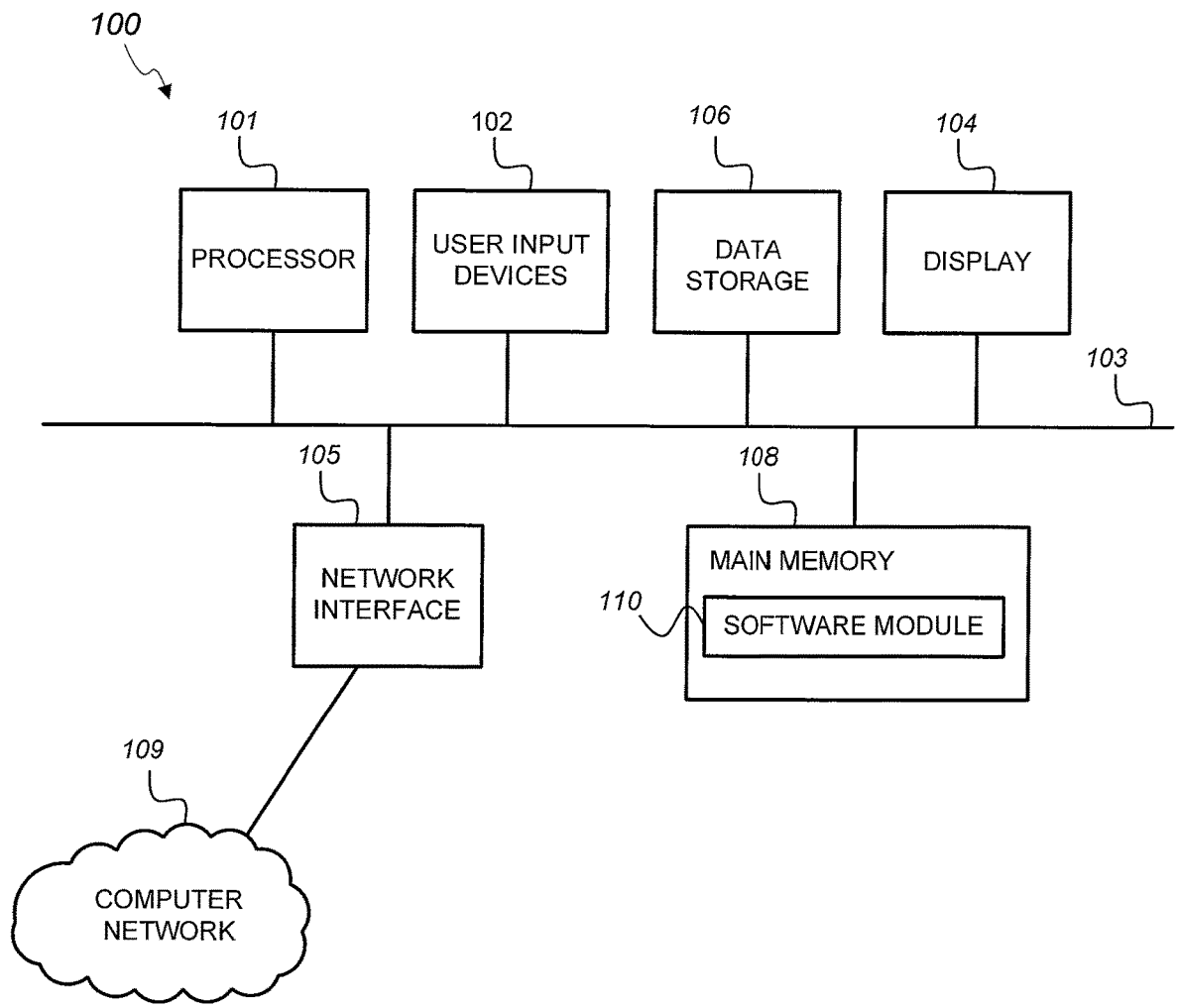
FIG. 5 shows a logical diagram of a computer system that may be employed with embodiments of the present invention.

Referring now to FIG. 5, there is shown a logical diagram of a computer system 100 that may be employed with embodiments of the present invention. The computer system 100 may be employed as a part of a serverless computing platform, for example. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the public Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a part of a serverless computing platform, the software modules 110 may comprise instructions of an ephemeral environment that includes a security module as described above.

Systems and methods for scanning remotely-located files for malicious code have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of scanning a remotely-located file for malicious code, the method comprising:
   storing a file in a public cloud storage;
   creating a memory-mapped space in an ephemeral environment of a serverless computing platform, the memory-mapped space comprising memory locations that are mapped to an entire content of the file, the file having a file size that is larger than a memory limit of the ephemeral environment;
   detecting access to a first plurality of memory locations in the memory-mapped space;
   in response to detecting access to the first plurality of memory locations, retrieving a first plurality of sections of the file from the public cloud storage over the public Internet, the first plurality of memory locations being designated to store the first plurality of sections;
   allocating memory in the ephemeral environment for the first plurality of memory locations;
   storing the first plurality of sections in the first plurality of memory locations;
   scanning the first plurality of sections in the first plurality of memory locations for malicious code;
   detecting access to a second plurality of memory locations in the memory-mapped space;
   in response to detecting access to the second plurality of memory locations, retrieving a second plurality of sections of the file from the public cloud storage over the public Internet, the second plurality of memory locations being designated to store the second plurality of sections;
   before allocating memory in the ephemeral environment for the second plurality of memory locations, releasing memory allocated for the first plurality of memory locations after scanning the first plurality of sections for malicious code;
   allocating memory in the ephemeral environment for the second plurality of memory locations;
   storing the second plurality of sections in the second plurality of memory locations; and
   scanning the second plurality of sections in the second plurality of memory locations for malicious code.

2. The method of claim 1, further comprising:
   receiving, in the serverless computing platform, an event notification in response to storing the file in the public cloud storage; and
   starting an instance of the ephemeral environment in the serverless computing platform in response to the event notification.

3. The method of claim 1, wherein detecting access to the first plurality of memory locations in the memory-mapped space comprises:
   marking the first plurality of memory locations as protected; and
   receiving a signal in response to detecting access to the protected first plurality of memory locations.

4. The method of claim 1, further comprising:
   destroying the ephemeral environment after completing scanning of the file for malicious code.

5. A system comprising:
   a public cloud storage that is configured to receive a file over the public Internet, store the file in the public cloud storage, and send an event notification in response to the storage of the file in the public cloud storage; and
   a serverless computing platform that is configured to receive the event notification over the public Internet, create an instance of an ephemeral environment in response to receiving the event notification, and execute a security module in the ephemeral environment,
   wherein the security module is configured to:
      create a memory-mapped space that comprises memory locations that are mapped to an entire content of the file, the file having a file size that is larger than a memory limit of the ephemeral environment;
      detect access to a first plurality of memory locations in the memory-mapped space;
      retrieve a first plurality of sections of the file from the public cloud storage, the first plurality of memory locations being designated to store the first plurality of sections;
      allocate memory in the ephemeral environment for the first plurality of memory locations;
      store the first plurality of sections in the first plurality of memory locations;
      scan the first plurality of sections in the first plurality of memory locations for malicious code;
      detect access to a second plurality of memory locations in the memory-mapped space;

retrieve a second plurality of sections of the file from the public cloud storage, the second plurality of memory locations being designated to store the second plurality of sections;

before allocating memory for the second plurality of memory locations, release memory allocated for the first plurality of memory locations after scanning the first plurality of sections for malicious code;

allocate memory in the ephemeral environment for the second plurality of memory locations;

store the second plurality of sections in the second plurality of memory locations; and scan the second plurality of sections in the second plurality of memory locations for malicious code.

6. The system of claim 5, wherein the serverless computing platform is configured to destroy the ephemeral environment after completing scanning of the file for malicious code.

\* \* \* \* \*